US008454855B1

(12) United States Patent  (10) Patent No.: US 8,454,855 B1
Bailey et al.  (45) Date of Patent: Jun. 4, 2013

(54) HYDROGEN STORAGE MATERIALS AND RELATED METHODS AND SYSTEMS

(75) Inventors: Mark S. Bailey, San Diego, CA (US); Steven S. Kaye, San Diego, CA (US); Bin Li, San Diego, CA (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 417 days.

(21) Appl. No.: 12/776,284

(22) Filed: May 7, 2010

Related U.S. Application Data

(60) Provisional application No. 61/176,861, filed on May 8, 2009.

(51) Int. Cl.
*C01B 21/092* (2006.01)
*C01B 3/04* (2006.01)
(52) U.S. Cl.
USPC ............. 252/182.34; 423/413; 423/648.1
(58) Field of Classification Search
USPC ....... 423/413, 351, 644, 657, 648.1; 420/900; 502/400; 252/182.34
See application file for complete search history.

(56) References Cited

U.S. PATENT DOCUMENTS 7,537,748 B2 * 5/2009 Fujii et al. .................. 423/413

OTHER PUBLICATIONS

Hu et al. "Improvement of hydrogen storage properties of the Li-Mg-N-H System by Addition of LiBH4" 2008 Chem.Mater. 20, 4398-4402.*
Hang Hu "Ultrafast Reaction between LiH and NH3 during H2 Storage in Li3N", 2003 American Chemical Society J. PHys. Chem. A, vol. 107, No. 46, 9737-9739.*
Xiong et al. "Thermodynamic and kinetic investigations of the hydrogen storage in the Li-Mg-N-H system" 2005 Journal of Alloys and Compounds 398, 235-239.*
Luo "(LiNH2-MgH2): A viable hydrogen storage system" 2004 Journal of Alloys and Compounds 381, 284-287.*
Vajo et al. "Altering Hydrogen Storage Properties by Hydride Destabilization through Alloy Formation: LiH and MgH2 Destabilized with Si" 2004, J. Phys. Chem. B 2004, 108, 13977-13983.*

* cited by examiner

*Primary Examiner* — Wayne Langel
*Assistant Examiner* — Syed Iqbal
(74) *Attorney, Agent, or Firm* — Corridor Law Group, P.C.

(57) ABSTRACT

Described herein are hydrogen storage materials having desirable characteristics for a variety of applications, such as automobile applications. In one embodiment, a hydrogen storage material includes: (1) a mixed imide having a formula $Li_iMg_jN_kH_l$; and (2) a set of additives; wherein each of i, k, and l is in the range of 1.7 to 2.3, and j is in the range of 0.7 to 1.3; and wherein the hydrogen storage material is configured to absorb at least 3.1 wt. % of $H_2$ within 30 minutes of exposure to $H_2$ gas at a temperature in the range of 100° C. to 140° C. and a pressure in the range of 45 bar to 50 bar.

18 Claims, 7 Drawing Sheets

HYDROGEN STORAGE MATERIALS AND RELATED METHODS AND SYSTEMS

CROSS REFERENCE TO RELATED APPLICATION

This application claims the benefit of U.S. Provisional Application Ser. No. 61/176,861, filed on May 8, 2009, the disclosure of which is incorporated herein by reference in its entirety.

FIELD OF THE INVENTION

The invention relates generally to hydrogen storage materials. More particularly, the invention relates to hydrogen storage materials having desirable characteristics for a variety of applications, such as automobile applications.

BACKGROUND

Hydrogen is a potential clean energy source for a variety of applications, such as automobile applications. Hydrogen includes about three times the energy of gasoline by mass and produces water as a by-product of combustion. However, due to its low density in gas or liquid form, hydrogen includes significantly less energy per unit volume relative to gasoline. In order to carry a sufficient amount of hydrogen, an automobile has to allocate a large amount of valuable space for a high pressure tank or a cryogenically cooled storage tank. Therefore, a barrier for commercialization of hydrogen-powered automobiles is a hydrogen storage system with a volumetric density greater than that of liquid hydrogen. Desirably, the storage system should also have a high gravimetric capacity, such as in terms of weight percent of hydrogen relative to a total weight (or wt. % $H_2$), have fast kinetics, and operate under moderate temperatures and pressures over hundreds of cycles.

Solid-state hydrogen storage materials have the potential to meet desired criteria for a hydrogen storage system. Materials such as $LaNi_5H_6$ and $TiFeH_2$ reversibly store hydrogen at volumetric densities superior to liquid hydrogen and under moderate temperatures and pressures. However, the gravimetric capacities of these materials are considered too low for typical automobile applications. Other materials, such as $NaAlH_4$ and other complex metal hydrides, have higher gravimetric capacities, but suffer from significant kinetic barriers to hydrogenation and dehydrogenation. Such kinetic barriers, in turn, can adversely impact a fueling time of hydrogen-powered automobiles.

One of the most promising classes of solid-state hydrogen storage materials is based upon hydrogenation and dehydrogenation of imides and amides. In particular, hydrogenation and dehydrogenation in the so-called Mg—N—H system occur between a mixed imide, namely $Li_2Mg(NH)_2$, and an amide and a hydride, namely $LiNH_2$ and $MgH_2$. $Li_2Mg(NH)_2$ can absorb up to about 5.5 wt. % $H_2$ with an enthalpy of hydrogenation of about −36 kJ/mol $H_2$. This enthalpy change corresponds to an equilibrium hydrogen pressure of about 1 bar at about 90° C., which is near-optimal for typical automobile applications. Despite its highly desirable thermodynamics, the Mg—N—H system suffers from a significant kinetic barrier, such that, even at higher temperatures in excess of about 180° C., hydrogenation can be incomplete after several hours. In addition, decomposition with ammonia evolution can be promoted at these higher temperatures. The combination of incomplete hydrogenation and dehydrogenation and ammonia evolution can contribute to an undesirable amount of capacity loss when operated over several cycles.

It is against this background that a need arose to develop the hydrogen storage materials and related methods and systems described herein.

SUMMARY

Certain embodiments of the invention relate to hydrogen storage materials having a number of desirable characteristics, such as high gravimetric capacity, excellent retention of gravimetric capacity over several hydrogenation and dehydrogenation cycles, fast kinetics, and high stability. The hydrogen storage materials exhibit these desirable characteristics while operating under moderate temperatures and pressures suitable for a variety of applications, such as automobile applications. Other embodiments of the invention relate to methods of synthesizing hydrogen storage materials, such as by ball milling. Further embodiments of the invention relate to methods of using hydrogen storage materials for storing and releasing hydrogen and hydrogen storage systems incorporating the hydrogen storage materials.

In one embodiment, a hydrogen storage material includes: (1) a mixed imide having a formula $Li_iMg_jN_kH_l$; and (2) a set of additives; wherein each of i, k, and l is in the range of 1.7 to 2.3, and j is in the range of 0.7 to 1.3; and wherein the hydrogen storage material is configured to absorb at least 3.1 wt. % of $H_2$ within 30 minutes of exposure to $H_2$ gas at a temperature in the range of 100° C. to 140° C. and a pressure in the range of 45 bar to 50 bar.

In another embodiment, a method of synthesizing a hydrogen storage material includes ball milling $LiNH_2$, $MgH_2$, and at least two different additives to form particles including $Li_2Mg(NH)_2$, wherein each of the additives is selected from oxides, hydrides, nitrides, chemical elements, supported metals, chlorides, porous carbon materials, particulate silicon materials, and intermetallics.

In another embodiment, a method of synthesizing a hydrogen storage material includes ball milling LiH, $Mg(NH_2)_2$, and at least two different additives to form particles including $Li_2Mg(NH)_2$, wherein each of the additives is selected from oxides, hydrides, nitrides, chemical elements, supported metals, chlorides, porous carbon materials, particulate silicon materials, and intermetallics.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

DETAILED DESCRIPTION

Definitions

Figure 1:
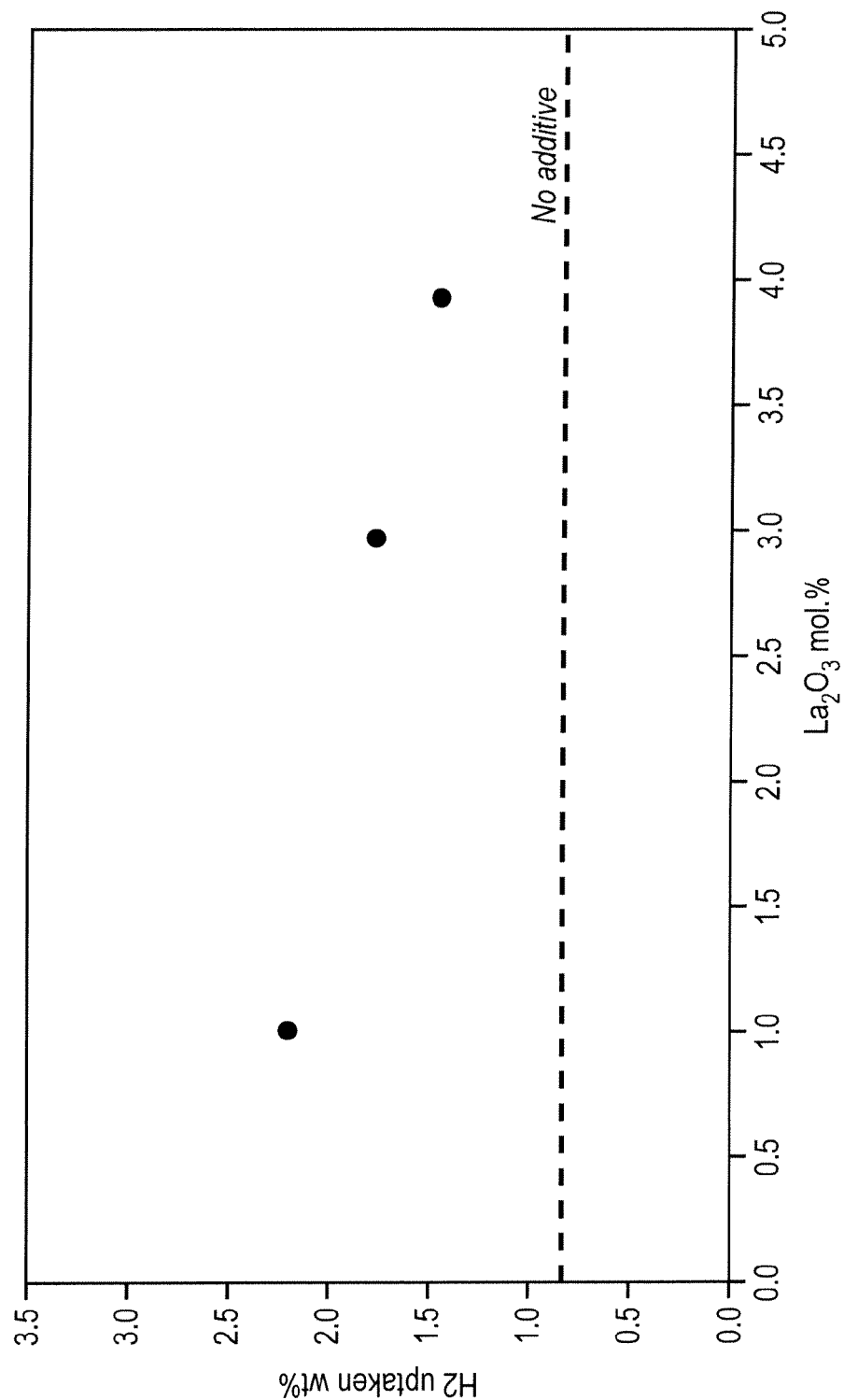
FIG. 1 illustrates hydrogen uptake from an absorption component of a primary screen of a series of materials synthesized from $2LiNH_2+1MgH_2+xLa_2O_3$, according to an embodiment of the invention.

The following definitions apply to some of the aspects described with respect to some embodiments of the invention. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common characteristics.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the term "size" refers to a characteristic dimension of an object. Thus, for example, a size of an object that is spherical can refer to a diameter of the object. In the case of an object that is non-spherical, a size of the object can refer to an average of various orthogonal dimensions of the object. Thus, for example, a size of an object that is a spheroidal can refer to an average of a major axis and a minor axis of the object. When referring to a set of objects as having a specific size, it is contemplated that the objects can have a distribution of sizes around the specific size. Thus, as used herein, a size of a set of objects can refer to a typical size of a distribution of sizes, such as an average size, a median size, or a peak size.

As used herein, the term "main group element" refers to a chemical element in any of Group IA (or Group 1), Group IIA (or Group 2), Group IIIA (or Group 13), Group IVA (or Group 14), Group VA (or Group 15), Group VIA (or Group 16), Group VIIA (or Group 17), and Group VIIIA (or Group 18). A main group element is also sometimes referred to as a s-block element or a p-block element.

As used herein, the term "transition metal" refers to a chemical element in any of Group IVB (or Group 4), Group VB (or Group 5), Group VIB (or Group 6), Group VIIB (or Group 7), Group VIIIB (or Groups 8, 9, and 10), Group IB (or Group 11), and Group IIB (or Group 12). A transition metal is also sometimes referred to as a d-block element.

As used herein, the term "rare earth element" refers to any of Sc, Y, La, Ce, Pr, Nd, Pm, Sm, Eu, Gd, Tb, Dy, Ho, Er, Tm, Yb, and Lu.

Hydrogen Storage Materials

Certain embodiments of the invention relate to hydrogen storage materials having a number of desirable characteristics, such as high gravimetric capacity, excellent retention of gravimetric capacity over several hydrogenation and dehydrogenation cycles, fast kinetics, and high stability. The hydrogen storage materials exhibit these desirable characteristics while operating under moderate temperatures and pressures suitable for a variety of applications, such as temperatures in the range of about 1° C. to about 140° C. and pressures from substantially vacuum conditions to about 100 bar, or from about 1 bar to about 100 bar, for automobile applications. Without wishing to be bound by a particular theory, these desirable characteristics can at least partially derive from the presence of a set of additives or modifiers as further described below.

For example, in terms of gravimetric capacity, hydrogen storage materials according to some embodiments of the invention can have a maximum hydrogen storage capacity of at least about 3.5 wt. % $H_2$, such as at least about 4 wt. % $H_2$, at least about 4.2 wt. % 1-17, or at least about 4.5 wt. % $H_2$, and up to about 5.5 wt. % $H_2$ or more, such as up to about 5.2 wt. % $H_2$, up to about 5 wt. % $H_2$, or up to about 4.8 wt. % $H_2$, based upon exposure to $H_2$ gas at a temperature in the range of about 80° C. to about 140° C., or from about 100° C. to about 140° C., and a pressure in the range of about 45 bar to about 50 bar. Also, the hydrogen storage materials exhibit excellent retention of hydrogen storage capacity over several hydrogenation and dehydrogenation cycles, with a loss of hydrogen storage capacity, per every 5 cycles, that is less than about 5% relative to an initial hydrogen storage capacity at the start of the 5 cycles, such as less than about 4%, less than about 3%, less than about 2%, or less than about 1%. In addition, the hydrogen storage materials exhibit fast kinetics so as to absorb, after 30 min of exposure to $H_2$ gas at a temperature in the range of about 100° C. to about 140° C. and a pressure in the range of about 45 bar to about 50 bar, at least about 1 wt. % $H_2$, such as at least about 2 wt. % $H_2$, at least about 3 wt. % $H_2$, at least about 3.1 wt. % $H_2$, or at least about 3.5 wt. % $H_2$, and up to about 5.5 wt. % $H_2$ or more, such as up to about 5.2 wt. % $H_2$, up to about 5 wt. % $H_2$, or up to about 4.8 wt. % $H_2$. It should be recognized that kinetics of hydrogen uptake can sometimes depend upon an extent to which the hydrogen storage materials are dehydrogenated or degassed prior to exposure to $H_2$ gas, with faster kinetics within the specified ranges typically correlating with a greater extent of dehydrogenation. The hydrogen storage materials also exhibit high stability with little or no decomposition with ammonia evolution, thereby prolonging cycle life.

A hydrogen storage material according to some embodiments of the invention is an improvement over the Mg—N—H system, and can be synthesized via a conversion of a set of precursor materials into the hydrogen storage material at high yields and at moderate temperatures and pressures. The synthesis can be represented with reference to the formula:

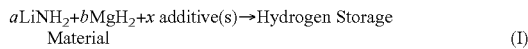

$$a\text{LiNH}_2 + b\text{MgH}_2 + x\, \text{additive(s)} \rightarrow \text{Hydrogen Storage Material} \qquad (I)$$

In formula (I), a can be in the range of about 1.7 to about 2.3, such as from about 1.8 to about 2.2 or from about 1.9 to about 2.1, and b can be in the range of about 0.7 to about 1.3, such as from about 0.8 to about 1.2 or from about 0.9 to about 1.1. In some instances, a can be about 2, b can be about 1, and the ratio of a and b can be about 2. It is contemplated that a and b can take on other values outside of the specified ranges, such as other values while maintaining the ratio of a and b to be about 2. It is also contemplated that $\text{LiNH}_2$ in formula (I) can be replaced by a hydride, namely LiH, and that $\text{MgH}_2$ in formula (I) can be replaced by an amide, namely $\text{Mg(NH}_2)_2$.

In formula (I), additive(s) is a set of additives that can correspond to a single additive, a pair of different additives, or a combination of three or more different additives. Examples of suitable additives include: (1) oxides, such as main group element oxides (e.g., alumina (or $\text{Al}_2\text{O}_3$)), transition metal oxides (e.g., zirconia (or $\text{ZrO}_2$) and niobia (or $\text{Nb}_2\text{O}_5$)), and rare earth element oxides (e.g., ceria (or $\text{CeO}_2$), lanthanum oxide (or $\text{La}_2\text{O}_3$), and yttria (or $\text{Y}_2\text{O}_3$)); (2) hydrides, such as main group element hydrides (e.g., LiH, NaH, KH, and $\text{CaH}_2$), transition metal hydrides (e.g., $\text{TiH}_2$), and ternary hydrides (e.g., $\text{LiAlH}_4$, $\text{LiBH}_4$, $\text{NaAlH}_4$, $\text{NaBH}_4$, and $\text{NH}_3\text{BH}_3$); (3) nitrides, such as main group element nitrides (e.g., $\text{Li}_3\text{N}$ and $\text{Mg}_3\text{N}_2$); (4) chemical elements, such as main group elements (e.g., Al, Si, B, C, Ca, Li, Mg, and Na), transition metals (e.g., Zn, Zr, Ni, Pd, Ti, V, Mn, Co, Cr, Cu, and Fe), and rare earth elements (e.g., La and Y); (5) supported metals (e.g., Pt_C, Pd_C, and Ru_C); (6) chlorides, such as main group element chlorides (e.g., $\text{AlCl}_3$), transition metal chlorides (e.g., $\text{CrCl}_2$, $\text{CrCl}_3$, CuCl, $\text{CuCl}_2$, $\text{FeCl}_3$, $\text{NiCl}_2$, $\text{TiCl}_3$, $\text{VCl}_3$, and $\text{ZnCl}_2$), and rare earth element chlorides (e.g., $\text{LaCl}_3$ and $\text{YCl}_3$); (7) porous carbon materials (e.g., mesoporous carbon); (8) particulate silicon materials (e.g., silicon nanoparticles having an average particle size in the range of about 1 nm to about 1 μm); and (9) intermetallics, such as intermetallics of rare earth elements and transition metals (e.g., $\text{LaNi}_5$).

Still referring to formula (I), x can be in the range of about 0.01 to about 10, such as from about 0.03 to about 2 or from about 0.1 to about 1.5. It is contemplated that x can take on other values outside of the specified ranges, such as a particular value greater than about 10 to further increase an amount of the set of additives. It is also contemplated that the amount of the set of additives can be expressed as an atomic percentage or a molar percentage (or X mol. %), which can be given by $X = 100x/(a+b+x)$ and can be in the range of about 0.1% to about 80%, such as from about 1% to about 40% or from about 3% to about 35%. In the case of a pair of additives, namely additive_1 and additive_2, total and relative amounts of the pair of additives can be represented as X mol. % [(1−y)additive_1 + y additive_2], where X represents the total amount of additive_1 and additive_2, and y represents a relative amount of additive_2 and is in the range of 0 to 1. In the case of a combination of three additives, namely additive_1, additive_2, and additive_3, total and relative amounts of the combination of additives can be represented as X mol. % [(1−y−y')additive_1 + y additive_2 + y' additive_3], where X represents the total amount of additive_1, additive_2, and additive_3, y represents a relative amount of additive_2, y' represents a relative amount of additive_3, and the sum of y and y' is in the range of 0 to 1.

Resulting hydrogen storage characteristics can depend upon the particular set of additives used for the synthesis according to formula (I), a total amount of the set of additives, and, in the case of a combination of multiple additives, a relative amount of each additive within the combination. Accordingly, the resulting hydrogen storage characteristics can be fine-tuned or optimized by proper selection of the set of additives and adjusting related parameters in formula (I). For example, in the case of certain oxides when used as single additives, such as $\text{La}_2\text{O}_3$, a particularly desirable value of x can be in the range of about 0.01 to about 0.05. As another example, in the case of certain hydrides when used as single additives, such as NaH, a particularly desirable value of x can be in the range of about 0.2 to about 0.6, and, in the case of other hydrides when used as single additives, such as $\text{LiBH}_4$, a particularly desirable value of x can be in the range of about 0.05 to about 0.5. As another example, in the case of certain nitrides when used as single additives, such as $\text{Li}_3\text{N}$, a particularly desirable value of x can be in the range of about 0.5 to about 1. As another example, in the case of certain chemical elements when used as single additives, such as V, a particularly desirable value of x can be in the range of about 0.1 to about 0.5. As another example, in the case of certain supported metals when used as single additives, such as Pd_C, a particularly desirable value of x can be in the range of about 0.55 to about 0.95. As another example, in the case of certain chlorides when used as single additives, such as $\text{LaCl}_3$, a particularly desirable value of x can be in the range of about 0.01 to about 0.3. As another example, in the case of certain porous carbon materials when used as single additives, such as mesoporous carbon, a particularly desirable value of x can be in the range of about 0.8 to about 2, or from about 0.8 to about 1.5. As another example, in the case of certain particulate silicon materials when used as single additives, such as silicon nanoparticles, a particularly desirable value of x can be in the range of about 0.1 to about 0.5. As another example, in the case of certain intermetallics when used as single additives, such as $\text{LaNi}_5$, a particularly desirable value of x can be in the range of about 0.01 to about 0.1. As another example, in the case of certain hydrides and nitrides when used as pairs of additives, such as $\text{LiBH}_4$ and $\text{Li}_3\text{N}$, particularly desirable values for X mol. % [(1−y)nitride + y hydride] can correspond to X in the range of about 3% to about 30% and y in the range of about 0.05 to about 0.4. As another example, in the case of certain hydrides and chemical elements when used as pairs of additives, such as $\text{LiBH}_4$ and La, particularly desirable values for X mol. % [(1−y)chemical element + y hydride] can correspond to X in the range of about 1% to about 20% and y in the range of about 0.7 to about 0.95. As a further example, in the case of certain hydrides, nitrides, and chemical elements when used as combinations of three additives, such as $\text{LiBH}_4$, $\text{Li}_3\text{N}$, and La, particularly desirable values for X mol. % [(1−y−y')chemical element + y nitride + y' hydride] can correspond to X in the range of 3% to about 30%, y in the range of about 0.3 to about 0.7, y' in the range of about 0.2 to about 0.6, and the sum of y and y' in the range of 0 to 1.

The synthesis according to formula (I) can be carried out using a variety of techniques. One desirable technique is ball milling, which can involve forming an alloy or a substantially homogeneous blend from a mixture of the precursor materials in a ball milling device. The precursor materials can be provided as powders, and, during ball milling, particles of the powders can undergo repeated collisions with grinding ball bearings, causing deformation, welding, and fracture of the particles that can result in micro-structural and chemical composition changes. Ball milling can be carried out in an inert gas atmosphere, such as one including helium, neon, argon, krypton, xenon, or a mixture thereof, or in a reactive gas atmosphere, such as one including a reactive component that contributes to micro-structural and chemical composition changes. As a result of ball milling, the precursor materials are mixed such that a resulting particulate material is an alloy, a blend, or a combination of an alloy and a blend. Depending upon ball milling conditions used, the resulting particulate material can have an average particle size or an average grain size in the range of about 1 nm to about 10 μm, such as from about 1 nm to about 1 μm from about 1 nm to about 100 nm, or from about 1 nm to about 10 nm. In some instances, smaller particle sizes can yield superior hydrogen storage characteristics relative to larger particle sizes, as a result of surface area effects.

Desirably, a high throughput ball milling device can be implemented for massively parallel ball milling operations. In particular, the ball milling device can perform ball milling operations on hundreds or even thousands of different mixtures of precursor materials in parallel, yielding a large number of resulting materials that can be tested to identify those that have desirable hydrogen storage characteristics. For some implementations, the ball milling device can include a rotary platform, which can rotate about a main axis, and multiple receptacles, which are rotatably mounted on the rotary platform. Each receptacle can rotate about a respective axis, which can be substantially parallel to the main axis of rotation, and can be implemented to hold a set of wells implemented as a multi-well ball milling fixture. The ball milling device can also include a motor or another drive mechanism that causes the rotary platform and the receptacles to rotate. Certain aspects of the ball milling device can be implemented as described in US 2007/0031295, entitled "High Throughput Mechanical Alloying and Screening" and published on Feb. 8, 2007; US 2007/0178019, entitled "High Throughput Mechanical Alloying and Screening" and published on Aug. 2, 2007; US 2008/0085221, entitled "High Throughput Mechanical Alloying and Screening" and published on Apr. 10, 2008; and WO 2007/019226, entitled "High Throughput Mechanical Alloying and Screening" and published on Feb. 15, 2007; the disclosures of which are incorporated herein by reference in their entireties.

Other techniques can be used to carry out the synthesis according to formula (I), including other agitation techniques such as attritor milling and shaker milling. For example, attritor milling can involve a mechanical grinding process in which a starting material undergoes repeated collisions with an internally agitated, expanding grinding media. Attritor milling can be carried out using a suitable attritor, such as a batch attritor or a horizontal attritor. Suitable grinding media include those formed of ceramic, glass, plastic, and steel. As another example, shaker milling can involve a mechanical milling process in which a starting material undergoes repeated collisions with grinding media while being subjected to repeated vibrations in multiple, substantially orthogonal directions. Shaker milling can be carried out using a suitable shaker mill, such as a shaker ball mill.

Depending upon the particular set of additives used and conditions during the synthesis according to formula (I), the resulting hydrogen storage material can include the set of additives as a set of dispersed components within a blend, as a set of alloying components or a set of dopants, or as a combination of a set of dispersed components and a set of dopants. In the case of a blend, the resulting hydrogen storage material can sometimes be represented with reference to the formula:

$$Li_2Mg(NH)_2 + additive(s) \qquad (II)$$

where the set of additives can be dispersed within a matrix of a mixed imide, namely $Li_2Mg(NH)_2$. Certain additives can promote the synthesis of the mixed imide having superior hydrogen storage characteristics by serving as processing aids. For example, certain additives can serve as hard materials that promote grinding of particles during ball milling, such that a resulting particulate material has a smaller average particle size, which, in turn, can lead to shorter diffusion lengths and faster kinetics for hydrogenation and dehydrogenation. Without wishing to be bound by a particular theory, examples of additives that can serve as hard materials include certain oxides, such as $Al_2O_3$, $La_2O_3$, $Nb_2O_3$, $Y_2O_3$, and $ZrO_2$; and certain chemical elements, such as B. As another example, certain additives can serve as dispersants that reside adjacent to grain boundaries and hinder undesirable agglomeration of particles during ball milling or during subsequent processing or use. Without wishing to be bound by a particular theory, examples of additives that can serve as dispersants include certain oxides, such as $CeO_2$; certain porous carbon materials, such as mesoporous carbon; certain chemical elements, such as La, Si, and Y; certain chlorides, such as $LaCl_3$ and $YCl_3$; and certain particulate silicon materials, such as silicon nanoparticles. Alternatively, or in conjunction, certain additives can yield faster kinetics for hydrogenation and dehydrogenation by serving as catalysts to promote dissociation of molecular hydrogen into atomic hydrogen or vice versa. Without wishing to be bound by a particular theory, examples of additives that can serve as catalysts include certain supported metals, such as Pt_C, Pd_C, and Ru_C; certain chemical elements, such as Co, Cr, Cu, Fe, Ni, Pd, Ti, V, Zn, and Zr; certain chlorides, such as $CrCl_2$, CuCl, $CuCl_2$, $FeCl_3$, $NiCl_2$, $ZnCl_2$, $TiCl_3$, and $VCl_3$; certain intermetallics, such as $LaNi_5$; and certain hydrides, such as $TiH_2$.

In the case of doping, the resulting hydrogen storage material can sometimes be represented with reference to the formula:

$$Li_2Mg(NH)_2[additive(s)] \qquad (III)$$

where the set of additives can at least partially replace a set of components within the mixed imide, namely $Li_2Mg(NH)_2$. For example, certain additives can serve as substitutional additives that replace at least a certain fraction of Mg to yield superior hydrogen storage characteristics. Without wishing to be bound by a particular theory, examples of additives that can serve in such Mg-substitution role include certain chemical elements, such as Al, Ca, and Li, either added directly or derived from certain chlorides, such as $AlCl_3$; certain hydrides, such as $CaH_2$, $LiAlH_4$, LiH, and KH; and certain nitrides, such as $Li_3N$. As another example, certain additives can serve as substitutional additives that replace at least a certain fraction of Li to yield superior hydrogen storage characteristics. Without wishing to be bound by a particular theory, examples of additives that can serve in such Li-substitution role include certain chemical elements, such as Mg and Na, either added directly or derived from certain hydrides, such as $NaAlH_4$, NaH, and KH. As a further example, certain additives can serve as substitutional additives that replace at least a certain fraction of N (or NH) to yield superior hydrogen storage characteristics. Without wishing to be bound by a particular theory, examples of additives that can serve in such N (or NH)-substitution role include certain chemical elements, such as C; and certain hydrides, such as $NH_3BH_3$. It is contemplated that a particular additive can serve in multiple substitution roles, such as KH that can serve in a Li-substitution role as well as a Mg-substitution role. It is also contemplated that a particular substitutional additive can serve as either of, or both, a processing aid and a catalyst. It is further contemplated that the mixed imide in formula (I) and (II) can be more generally represented as $Li_jMg_iN_kH_i$, where i, k, and/each can be in the range of about 1.7 to about 2.3, such as from about 1.8 to about 2.2 or from about 1.9 to about 2.1, and j can be in the range of about 0.7 to about 1.3, such as from about 0.8 to about 1.2 or from about 0.9 to about 1.1.

Uses of Hydrogen Storage Materials

The hydrogen storage materials described herein can be used for a variety of applications, ranging from fuel cells, portable power generation, and hydrogen combustion engines. For example, the hydrogen storage materials can be substituted in place of, or used in conjunction with, conventional solid-state hydrogen storage materials for automobile applications involving fuel cells. Once synthesized, the hydrogen storage materials can be incorporated within suitable containers, which can replace conventional gasoline tanks and can be used as clean energy sources to power hydrogen fuel cells.

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Example 1

Methodology for Synthesis and Characterization of Hydrogen Storage Materials

Hydrogen storage materials were synthesized using a high throughput ball milling device, which was implemented using certain techniques described in US 2007/0031295, US 2007/0178019, US 2008/0085221, and WO 2007/019226 referenced above. Ball milling was carried out to yield an acceleration between about 10 g and about 38 g for a total milling time between about 5 hr and about 36 hr, such as about 38 g for about 24 hr. The total milling time included multiple active milling periods, which were interrupted by a variety of pause or rest periods, such as with active milling periods between about 2 hr and about 7 hr and with rest periods between about 0.5 hr and about 2 hr. Ball milling was carried out under an inert gas atmosphere or a reactive gas atmosphere at a pressure of up to about 40 bar, such as under He or $H_2$ gas at about 20 bar.

Following ball milling, hydrogen uptake characteristics of the resulting materials were measured using a multi-channel gas sorption device, which was implemented using certain techniques described in US 2007/0031295, US 2007/0178019, US 2008/0085221, and WO 2007/019226 referenced above. A primary screening protocol used for the measurements is described as follows. The materials were degassed by exposing to He gas at about 5 bar and heating from room temperature to about 140° C. in about 10 min, and, once at that temperature for about 20 min, dynamic vacuum was applied for about 25 min. Subsequently, an absorption component of the protocol was carried out by exposing the materials to $H_2$ gas at about 45 bar for about 30 min at about 140° C., before being cooled to room temperature. Data were recorded at multiple times during the primary screening protocol, although the subsequent discussion will primarily focus on hydrogen uptake after about 30 min at about 140° C. The total time for the primary screening protocol was about 2.5 hr.

Hydrogen uptake as a function of temperature was measured using a PCT-PRO 2000 gas sorption device (Hy-Energy LLC). Measurements were carried out at about 100° C., about 120° C., and about 140° C. with an initial $H_2$ gas pressure of about 50 bar. Materials were degassed at about 140° C. for about 15 hr prior to the measurements.

Example 2

Synthesis and Characterization of Hydrogen Storage Materials with Oxide Additives Hydrogen storage materials were synthesized using oxide additives and characterized in accordance with the methodology set forth in Example 1. In particular, the oxide additives corresponded to $Al_2O_3$, $CeO_2$, $La_2O_3$, $Y_2O_3$, $ZrO_2$, and $Nb_2O_5$.

For example, in an argon-filled glove box, $LiNH_2$, $MgH_2$, and $La_2O_3$ were added into hardened tool steel wells (about 19.7 mL in volume) in stoichiometric ratios of about 2:1:x (x=0.03, 0.06, 0.09, and 0.12), along with 38 chrome steel ball bearings (about 5 mm in diameter). The wells were sealed, removed from the glove box, and charged with He gas at about 20 bar. The wells were then subjected to ball milling at about 38 g for a total milling time of about 24 hr. Ball milling was carried out with three active milling periods of about 7 hr, one active milling period of about 3 hr, and rest periods of about 30 min. Hydrogen uptake characteristics of the resulting materials were measured in accordance with the primary screening protocol, and results of the measurements are illustrated in FIG. 1 and are based on exposure to $H_2$ gas at about 45 bar for about 30 min at about 140° C. As can be appreciated with reference to FIG. 1, hydrogen uptake of the series of materials synthesized from $2LiNH_2+1MgH_2+xLa_2O_3$ varied with the amount of the oxide additive, and the materials typically exhibited superior kinetics in hydrogen uptake relative to the absence of an additive. Among the materials synthesized, a stoichiometric ratio of about $LiNH_2$: $MgH_2$:$La_2O_3$::2:1:0.03 (total mass of about 342 mg and mol. % of $La_2O_3$ at about 0.99) exhibited a maximum hydrogen uptake of about 2.21 wt. % $H_2$ in about 30 min at temperature and pressure conditions of the primary screening protocol.

Example 3

Synthesis and Characterization of Hydrogen Storage Materials with Hydride Additives Hydrogen storage materials were synthesized using hydride additives and characterized in accordance with the methodology set forth in Example 1. In particular, the hydride additives corresponded to LiH, NaH, KH, $CaH_2$, $TiH_2$, $LiAlH_4$, $LiBH_4$, $NaAlH_4$, $NaBH_4$, and $NH_3BH_3$.

For example, in an argon-filled glove box, $LiNH_2$, $MgH_2$, and NaH were added into hardened tool steel wells (about 19.7 mL in volume) in stoichiometric ratios of about 2:1:x (x=0.75, 0.57, 0.41, 0.26, and 0.12), along with 38 chrome steel ball bearings (about 5 mm in diameter). The wells were sealed, removed from the glove box, and charged with He gas at about 20 bar. The wells were then subjected to ball milling at about 38 g for a total milling time of about 24 hr. Ball milling was carried out with three active milling periods of about 7 hr, one active milling period of about 3 hr, and rest periods of about 30 min. Following ball milling, hydrogen uptake characteristics of the resulting materials were measured in accordance with the primary screening protocol. Hydrogen uptake of the series of materials synthesized from $2LiNH_2+1MgH_2+xNaH$ varied with the amount of the hydride additive, and the materials typically exhibited superior kinetics in hydrogen uptake relative to the absence of an additive. Among the materials synthesized, a stoichiometric ratio of about $LiNH_2:MgH_2:NaH::2:1:0.41$ (total mass of about 313 mg and mol. % of NaH at about 12.0) exhibited a maximum hydrogen uptake of about 2.4 wt. % $H_2$ in about 30 min at about 140° C. and about 45 bar.

As another example, in an argon-filled glove box, $LiNH_2$, $MgH_2$, and $LiBH_4$ were added into hardened tool steel wells (about 19.7 mL in volume) in stoichiometric ratios of about 2:1:x (x=0.1, 0.16, 0.2, 0.3, 0.33, 0.4, 0.5, 0.6, 0.7, 0.75, 0.8, 0.9, 1.0, 1.1, 1.3, 1.6, 2, and 7), along with 38 chrome steel ball bearings (about 5 mm in diameter). The wells were sealed, removed from the glove box, and charged with He gas at about 20 bar. The wells were then subjected to ball milling at about 38 g for a total milling time of about 24 hr. Ball milling was carried out with three active milling periods of about 7 hr, one active milling period of about 3 hr, and rest periods of about 30 min. Following ball milling, hydrogen uptake characteristics of the resulting materials were measured in accordance with the primary screening protocol. Hydrogen uptake of the series of materials synthesized from $2LiNH_2+1MgH_2+xLiBH_4$ varied with the amount of the hydride additive, and the materials typically exhibited superior kinetics in hydrogen uptake relative to the absence of an additive. Among the materials synthesized, a stoichiometric ratio of about $LiNH_2:MgH_2:LiBH_4::2:1:0.16$ (total mass of about 317 mg and mol. % of $LiBH_4$ at about 5.1) exhibited a maximum hydrogen uptake of about 2.9 wt. % $H_2$ in about 30 min at about 140° C. and about 45 bar.

Example 4

Synthesis and Characterization of Hydrogen Storage Materials with Nitride Additives Hydrogen storage materials were synthesized using nitride additives and characterized in accordance with the methodology set forth in Example 1. In particular, the nitride additives corresponded to $Li_3N$ and $Mg_3N_2$.

For example, in an argon-filled glove box, $LiNH_2$, $MgH_2$, and $Li_3N$ were added into hardened tool steel wells (about 19.7 mL in volume) in stoichiometric ratios of about 2:1:x (x=0.75, 0.57, 0.41, 0.26, and 0.12), along with 38 chrome steel ball bearings (about 5 mm in diameter). The wells were sealed, removed from the glove box, and charged with He gas at about 20 bar. The wells were then subjected to ball milling at about 38 g for a total milling time of about 24 hr. Ball milling was carried out with three active milling periods of about 7 hr, one active milling period of about 3 hr, and rest periods of about 30 min. Following ball milling, hydrogen uptake characteristics of the resulting materials were measured in accordance with the primary screening protocol. Hydrogen uptake of the series of materials synthesized from $2LiNH_2+1MgH_2+xLi_3N$ varied with the amount of the nitride additive, and the materials typically exhibited superior kinetics in hydrogen uptake relative to the absence of an additive. Among the materials synthesized, a stoichiometric ratio of about $LiNH_2:MgH_2$: (total mass of about 306 mg and mol. % of $Li_3N$ at about 20.0) exhibited a maximum hydrogen uptake of about 2.7 wt. % $H_2$ in about 30 min at about 140° C. and about 45 bar.

Example 5

Synthesis and Characterization of Hydrogen Storage Materials with Chemical Element Additives Hydrogen storage materials were synthesized using chemical elements as additives and characterized in accordance with the methodology set forth in Example 1. In particular, the chemical elements corresponded to Al, Si, B, C (graphite), Ca, Li, Mg, Na, Zn, Zr, Ni, Pd, Ti, V, Mn, Co, Cr, Cu, Fe, La, and Y.

For example, in an argon-filled glove box, $LiNH_2$, $MgH_2$, and V were added into hardened tool steel wells (about 19.7 mL in volume) in stoichiometric ratios of about 2:1:x (x=0.19, 0.26, 0.33, 0.53, and 0.74), along with 38 chrome steel ball bearings (about 5 mm in diameter). The wells were sealed, removed from the glove box, and charged with He gas at about 20 bar. The wells were then subjected to ball milling at about 38 g for a total milling time of about 24 hr. Ball milling was carried out with three active milling periods of about 7 hr, one active milling period of about 3 hr, and rest periods of about 30 min. Following ball milling, hydrogen uptake characteristics of the resulting materials were measured in accordance with the primary screening protocol. Hydrogen uptake of the series of materials synthesized from $2LiNH_2+1\ MgH_2+xV$ varied with the amount of the chemical element additive, and the materials typically exhibited superior kinetics in hydrogen uptake relative to the absence of an additive. Among the materials synthesized, a stoichiometric ratio of about $LiNH_2:MgH_2:V::2:1:0.33$ (total mass of about 365 mg and mol. % of V at about 9.9) exhibited a maximum hydrogen uptake of about 2.4 wt. % $H_2$ in about 30 min at about 140° C. and about 45 bar.

Example 6

Synthesis and Characterization of Hydrogen Storage Materials with Supported Metal Additives Hydrogen storage materials were synthesized using supported metals as additives and characterized in accordance with the methodology set forth in Example 1. In particular, the supported metals corresponded to Pt_C, Pd_C, and Ru_C.

For example, in an argon-filled glove box, $LiNH_2$, $MgH_2$, and Pd_C were added into hardened tool steel wells (about 19.7 mL in volume) in stoichiometric ratios of about 2:1:x (x=0.16, 0.33, 0.53, 0.74, and 1), along with 38 chrome steel ball bearings (about 5 mm in diameter). The wells were sealed, removed from the glove box, and charged with He gas at about 20 bar. The wells were then subjected to ball milling at about 38 g for a total milling time of about 24 hr. Ball milling was carried out with three active milling periods of about 7 hr, one active milling period of about 3 hr, and rest periods of about 30 min. Following ball milling, hydrogen uptake characteristics of the resulting materials were measured in accordance with the primary screening protocol. Hydrogen uptake of the series of materials synthesized from $2LiNH_2+1MgH_2+xPd\_C$ varied with the amount of the supported metal additive, and the materials typically exhibited superior kinetics in hydrogen uptake relative to the absence of an additive. Among the materials synthesized, a stoichiometric ratio of about $LiNH_2:MgH_2:Pd\_C::2:1:0.74$ (total mass of about 326 mg and mol. % of Pd_C at about 19.8) exhibited a maximum hydrogen uptake of about 2.2 wt. % $H_2$ in about 30 min at about 140° C. and about 45 bar.

Example 7

Synthesis and Characterization of Hydrogen Storage Materials with Chloride Additives Hydrogen storage materials were synthesized using chloride additives and characterized in accordance with the methodology set forth in Example 1. In particular, the chloride additives corresponded to $AlCl_3$, $CrCl_2$, $CrCl_3$, $CuCl$, $CuCl_2$, $FeCl_3$, $LaCl_3$, $NiCl_2$, $TiCl_3$, $VCl_3$, $YCl_3$, and $ZnCl_2$.

For example, in an argon-filled glove box, $LiNH_2$, $MgH_2$, and $LaCl_3$ were added into hardened tool steel wells (about 19.7 mL in volume) in stoichiometric ratios of about 2:1:x (x=0.06, 0.13, 0.19, 0.26, and 0.33), along with 38 chrome steel ball bearings (about 5 mm in diameter). The wells were sealed, removed from the glove box, and charged with He gas at about 20 bar. The wells were then subjected to ball milling at about 38 g for a total milling time of about 24 hr. Ball milling was carried out with three active milling periods of about 7 hr, one active milling period of about 3 hr, and rest periods of about 30 min. Following ball milling, hydrogen uptake characteristics of the resulting materials were measured in accordance with the primary screening protocol. Hydrogen uptake of the series of materials synthesized from $2LiNH_2+1 MgH_2+xLaCl_3$ varied with the amount of the chloride additive, and the materials typically exhibited superior kinetics in hydrogen uptake relative to the absence of an additive. Among the materials synthesized, a stoichiometric ratio of about $LiNH_2:MgH_2:LaCl_3::2:1:0.13$ (total mass of about 388 mg and mol. % of $LaCl_3$ at about 4.2) exhibited a maximum hydrogen uptake of about 1.5 wt. % $H_2$ in about 30 min at about 140° C. and about 45 bar. Certain other chloride additives, namely $CrCl_3$, $TiCl_3$, $VCl_3$, and $YCl_3$, also yielded superior kinetics in hydrogen uptake relative to the absence of an additive.

Example 8

Synthesis and Characterization of Hydrogen Storage Materials with Porous Carbon Additive Hydrogen storage materials were synthesized using mesoporous carbon (Darco) as an additive and characterized in accordance with the methodology set forth in Example 1. In particular, in an argon-filled glove box, $LiNH_2$, $MgH_2$, and mesoporous carbon were added into hardened tool steel wells (about 19.7 mL in volume) in stoichiometric ratios of about 2:1:x (x=0.16, 0.33, 0.53, 0.75, and 1), along with 38 chrome steel ball bearings (about 5 mm in diameter). The wells were sealed, removed from the glove box, and charged with He gas at about 20 bar. The wells were then subjected to ball milling at about 38 g for a total milling time of about 24 hr. Ball milling was carried out with three active milling periods of about 7 hr, one active milling period of about 3 hr, and rest periods of about 30 min. Following ball milling, hydrogen uptake characteristics of the resulting materials were measured in accordance with the primary screening protocol. Hydrogen uptake of the series of materials synthesized from $2LiNH_2+1MgH_2+x$ mesoporous carbon varied with the amount of the mesoporous carbon additive, and the materials typically exhibited superior kinetics in hydrogen uptake relative to the absence of an additive. Among the materials synthesized, a stoichiometric ratio of about $LiNH_2:MgH_2:$mesoporous carbon::2:1:1 (total mass of about 331 mg and mol. % of mesoporous carbon at about 25) exhibited a maximum hydrogen uptake of about 2.1 wt. % $H_2$ in about 30 min at about 140° C. and about 45 bar.

Example 9

Synthesis and Characterization of Hydrogen Storage Materials with Nanoparticle Silicon Additive Hydrogen storage materials were synthesized using nanoparticle silicon as an additive and characterized in accordance with the methodology set forth in Example 1. In particular, in an argon-filled glove box, $LiNH_2$, $MgH_2$, and nanoparticle silicon were added into hardened tool steel wells (about 19.7 mL in volume) in stoichiometric ratios of about 2:1:x (x=0.16, 0.33, 0.53, and 0.75), along with 38 chrome steel ball bearings (about 5 mm in diameter). The wells were sealed, removed from the glove box, and charged with He gas at about 20 bar. The wells were then subjected to ball milling at about 38 g for a total milling time of about 24 hr. Ball milling was carried out with three active milling periods of about 7 hr, one active milling period of about 3 hr, and rest periods of about 30 min. Following ball milling, hydrogen uptake characteristics of the resulting materials were measured in accordance with the primary screening protocol. Hydrogen uptake of the series of materials synthesized from $2LiNH_2+1MgH_2+x$ nanoparticle silicon varied with the amount of the nanoparticle silicon additive, and the materials typically exhibited superior kinetics in hydrogen uptake relative to the absence of an additive. Among the materials synthesized, a stoichiometric ratio of about $LiNH_2:MgH_2:$nanoparticle silicon::2:1:0.33 (total mass of about 327 mg and mol. % of nanoparticle silicon at about 9.9) exhibited a maximum hydrogen uptake of about 1.8 wt. % $H_2$ in about 30 min at about 140° C. and about 45 bar.

Example 10

Synthesis and Characterization of Hydrogen Storage Materials with Intermetallic Additive Hydrogen storage materials were synthesized using an intermetallic additive, namely $LaNi_5$, and characterized in accordance with the methodology set forth in Example 1.

In particular, in an argon-filled glove box, $LiNH_2$, $MgH_2$, and $LaNi_5$ were added into hardened tool steel wells (about 19.7 mL in volume) in stoichiometric ratios of about 2:1:x (x=0.015, 0.03, 0.05, and 0.06), along with 38 chrome steel ball bearings (about 5 mm in diameter). The wells were sealed, removed from the glove box, and charged with He gas at about 20 bar. The wells were then subjected to ball milling at about 38 g for a total milling time of about 24 hr. Ball milling was carried out with three active milling periods of about 7 hr, one active milling period of about 3 hr, and rest periods of about 30 min. Following ball milling, hydrogen uptake characteristics of the resulting materials were measured in accordance with the primary screening protocol. Hydrogen uptake of the series of materials synthesized from $2LiNH_2+1MgH_2+xLaNi_5$ varied with the amount of the intermetallic additive, and the materials typically exhibited superior kinetics in hydrogen uptake relative to the absence of an additive. Among the materials synthesized, a stoichiometric ratio of about $LiNH_2:MgH_2: LaNi_5::2:1:0.05$ (mol. % of LaNi$_5$ at about 1.6) exhibited a maximum hydrogen uptake of about 1.1 wt. % H$_2$ in about 30 min at about 140° C. and about 45 bar.

Example 11

Characterization of Hydrogen Storage Materials

Figure 2:
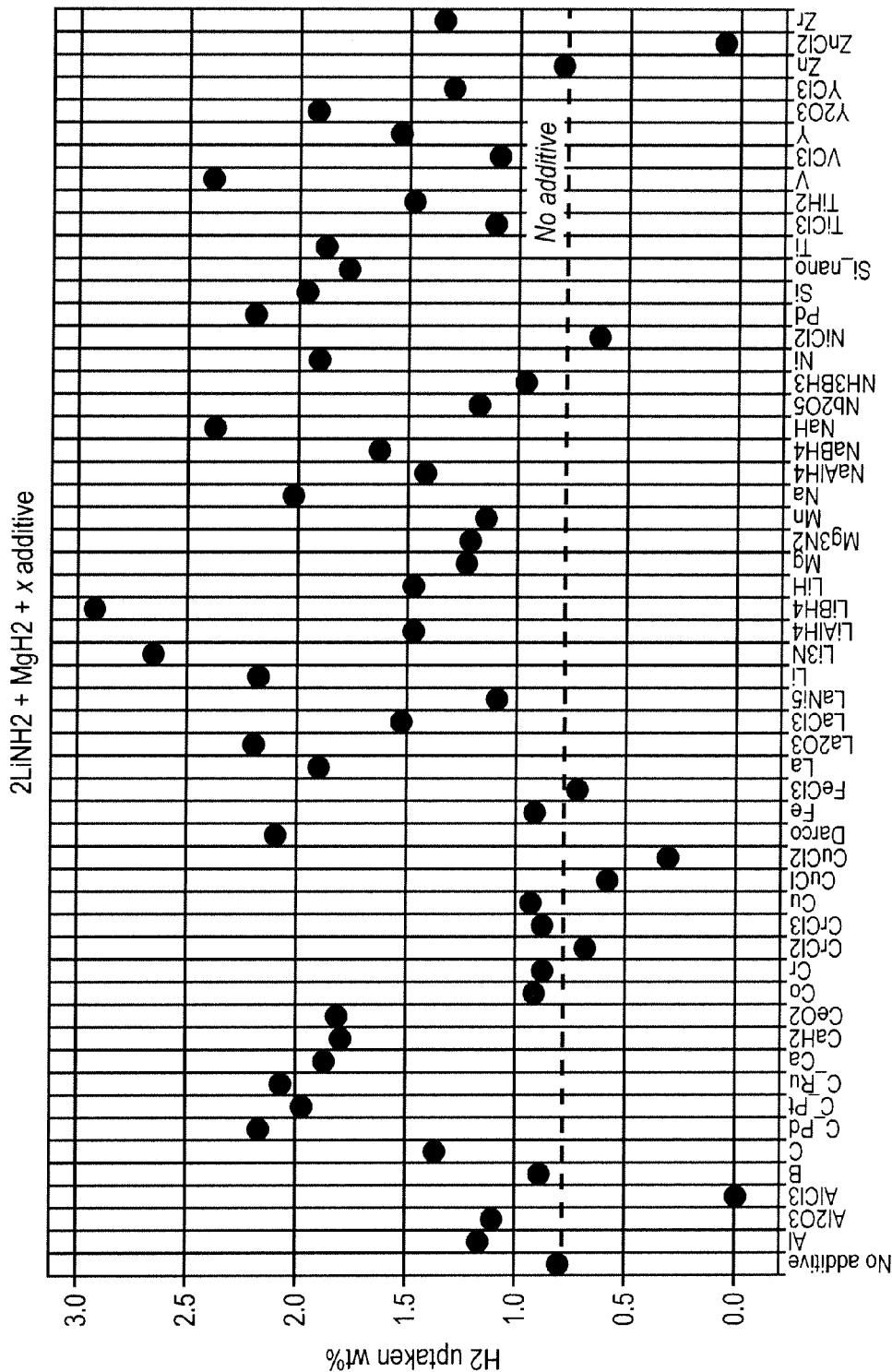
FIG. 2 illustrates maximum hydrogen uptake from an absorption component of a primary screen observed among materials synthesized from $2LiNH_2+1MgH_2+x$ additive, according to an embodiment of the invention.

Hydrogen storage materials were synthesized using a variety of additives and characterized in accordance with the methodology set forth in Example 1. In particular, hydrogen uptake of materials synthesized from 2LiNH$_2$+1MgH$_2$+x additive was measured in accordance with the primary screening protocol, with mol. % of the additives between about 1 and about 80 and depending upon respective masses of the additives. FIG. 2 illustrates results of the measurements, which correspond to maximum hydrogen uptake observed for each additive among the materials synthesized and are based on exposure to H$_2$ gas at about 45 bar for about 30 min at about 140° C. As can be appreciated with reference to FIG. 2, most of the additives yielded superior kinetics in hydrogen uptake relative to the absence of an additive.

Example 12

Synthesis and Characterization of Hydrogen Storage Materials with Pairs of Additives Hydrogen storage materials were synthesized using a variety of pairs of additives and characterized in accordance with the methodology set forth in Example 1. In particular, the pairs of additives corresponded to: (1) LiBH$_4$ and an oxide selected from Al$_2$O$_3$, CeO$_2$, La$_2$O$_3$, Y$_2$O$_3$, ZrO$_2$, and Nb$_2$O$_5$; (2) LiBH$_4$ and a hydride selected from CaH$_2$, LiH, NaH, and TiH$_2$; (3) LiBH$_4$ and Li$_3$N; (4) LiBH$_4$ and a chemical element selected from Ca, Co, Cr, Ni, Pd, Si, Ti, V, Zr, Fe, La, Li, Mn, and Na; (5) LiBH$_4$ and a supported metal selected from Pt_C and Ru_C; (6) LiBH$_4$ and a chloride selected from TiCl$_3$ and VCl$_3$; (7) LiBH$_4$ and mesoporous carbon (Darco); (8) Ca and a chemical element selected from Ni, Ti, and V; (9) Li and a chemical element selected from Ni, Ti, and V; and (10) Si and a chemical element selected from Ca and Li. For each pair of additives, both a total amount of additives within the pair and a relative amount of each additive within the pair were varied.

For example, in an argon-filled glove box, LiNH$_2$, MgH$_2$, LiBH$_4$, and Li$_3$N were added into hardened tool steel wells (about 19.7 mL in volume) in stoichiometric ratios of about 2:1::LiNH$_2$:MgH$_2$+X mol. % [(1−y)Li$_3$N+yLiBH$_4$] (X=10, 20, and 30 and y=0, 0.1, 0.2, 0.3, 0.4, 0.5, 0.6, 0.7, 0.8, 0.9, and 1), along with 38 chrome steel ball bearings (about 5 mm in diameter). The wells were sealed, removed from the glove box, and charged with He gas at about 20 bar. The wells were then subjected to ball milling at about 38 g for a total milling time of about 24 hr. Ball milling was carried out with three active milling periods of about 7 hr, one active milling period of about 3 hr, and rest periods of about 30 min. Following ball milling, hydrogen uptake characteristics of the resulting materials were measured in accordance with the primary screening protocol. Hydrogen uptake of the series of materials synthesized from 2LiNH$_2$+1MgH$_2$+X mol. % [(1−y)Li$_3$N+yLiBH$_4$] varied with the total and relative amounts of the additives, and the materials typically exhibited superior kinetics in hydrogen uptake relative to the absence of an additive. Among the materials synthesized, a stoichiometric ratio of about LiNH$_2$:MgH$_2$::2:1 with 2 mol. % LiBH$_4$ and 8 mol. % Li$_3$N (total mass of about 304 mg) exhibited a maximum hydrogen uptake of about 4.26 wt. % H$_2$ in about 30 min at about 140° C. and about 45 bar.

Figure 3:
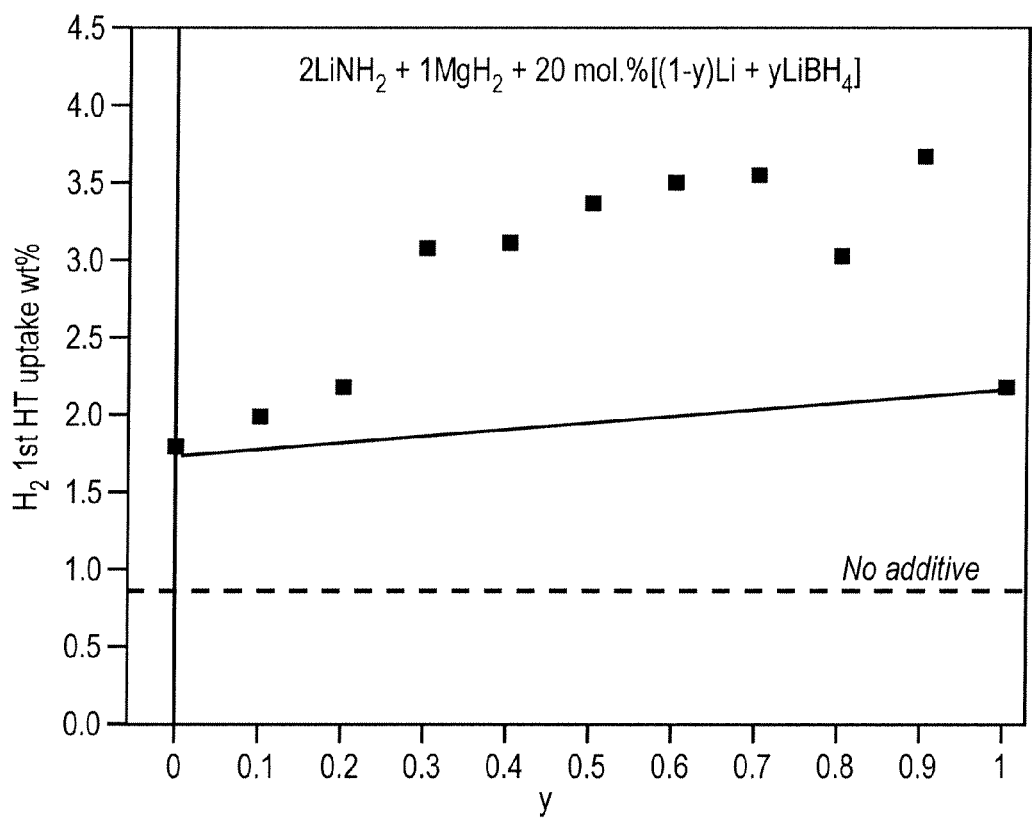
FIG. 3 illustrates hydrogen uptake from an absorption component of a primary screen of a series of materials synthesized from $2LiNH_2+1MgH_2+20$ mol. % $[(1-y)Li+yLiBH_4]$, according to an embodiment of the invention.
Figure 4:
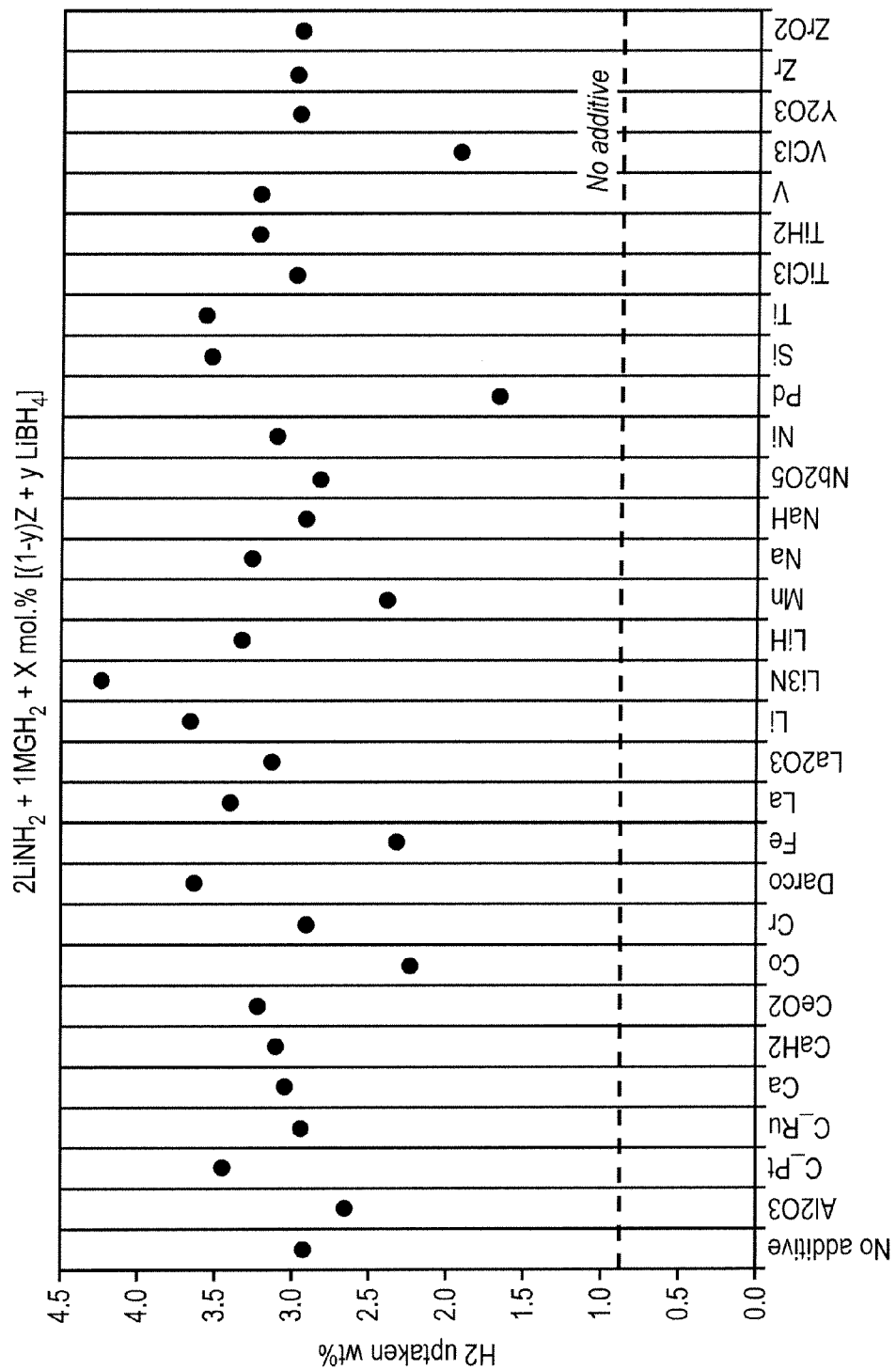
FIG. 4 illustrates maximum hydrogen uptake from an absorption component of a primary screen observed among materials synthesized from $2LiNH_2+1MgH_2+X$ mol. % $[(1-y)additive+yLiBH_4]$, according to an embodiment of the invention.
Figure 5:
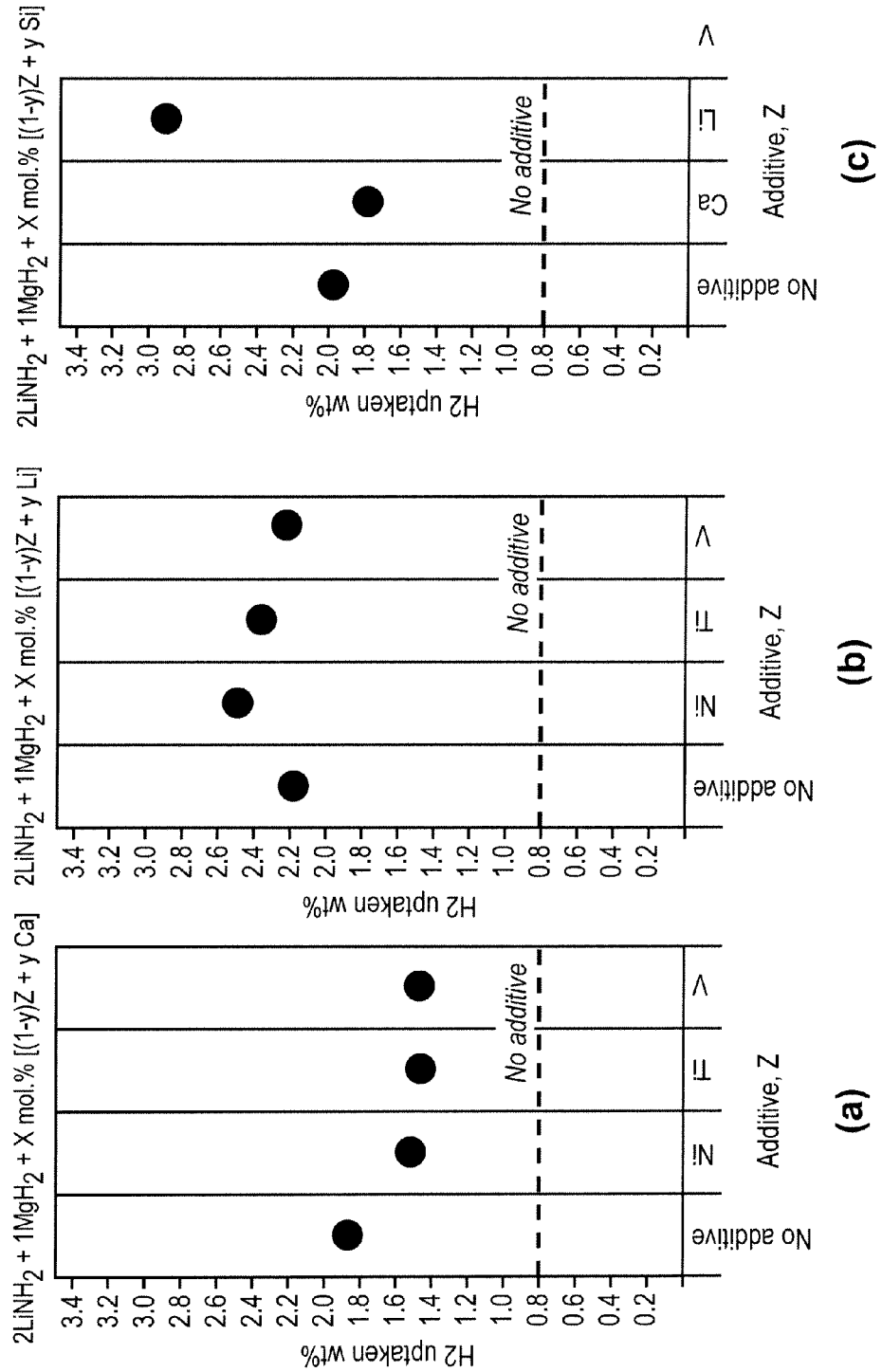
FIG. 5(a) illustrates maximum hydrogen uptake from an absorption component of a primary screen observed among materials synthesized from $2LiNH_2+1MgH_2+X$ mol. % $[(1-y)additive+yCa]$, according to an embodiment of the invention.
FIG. 5(b) illustrates maximum hydrogen uptake from an absorption component of a primary screen observed among materials synthesized from $2LiNH_2+1MgH_2+X$ mol. % $[(1-y)additive+yLi]$, according to an embodiment of the invention.
FIG. 5(c) illustrates maximum hydrogen uptake from an absorption component of a primary screen observed among materials synthesized from $2LiNH_2+1MgH_2+X$ mol. % $[(1-y)additive+ySi]$, according to an embodiment of the invention.

As another example, in an argon-filled glove box, LiNH$_2$, MgH$_2$, LiBH$_4$, and Li were added in stoichiometric ratios of about 2:1::LiNH$_2$:MgH$_2$+X mol. % [(1−y)Li+yLiBH$_4$] (X=10, 20, and 30 and y=0, 0.1, 0.2, 0.3, 0.4, 0.5, 0.6, 0.7, 0.8, 0.9, and 1), and subjected to ball milling to synthesize a series of materials. Following ball milling, hydrogen uptake characteristics of the resulting materials were measured in accordance with the primary screening protocol. FIG. 3 illustrates results of measurements for the series of materials synthesized from 2LiNH$_2$+1MgH$_2$+20 mol. % [(1−y)Li+yLiBH$_4$], which are based on exposure to H$_2$ gas at about 45 bar for about 30 min at about 140° C. Among the series of materials synthesized, a maximum hydrogen uptake observed was about 3.6 wt. % H$_2$, and was located at about y=0.9. A sloped line connecting the leftmost and rightmost data points represents an expected effect on hydrogen uptake if Li and LiBH$_4$ behaved in an additive fashion. As can be appreciated with reference to FIG. 3, the actual enhancement in hydrogen uptake significantly exceeded the expected effect, which indicates a synergy between Li and LiBH$_4$ to produce a greater effect than the sum of their individual effects.

The effect of different pairs of additives is summarized in FIG. 4, FIG. 5(a), FIG. 5(b), and FIG. 5(c), which illustrate maximum hydrogen uptake observed among the materials synthesized from 2LiNH$_2$+1MgH$_2$+X mol. % [(1−y)additive+yLiBH$_4$], 2LiNH$_2$+1MgH$_2$+X mol. % [(1−y)additive+yCa], 2LiNH$_2$+1MgH$_2$+X mol. % [(1−y)additive+y Li], and 2LiNH$_2$+1MgH$_2$+X mol. % [(1−y)additive+ySi], respectively. As can be appreciated with reference to FIG. 4, FIG. 5(a), FIG. 5(b), and FIG. 5(c), the pairs of additives yielded superior kinetics in hydrogen uptake relative to the absence of an additive.

Example 13

Figure 6:
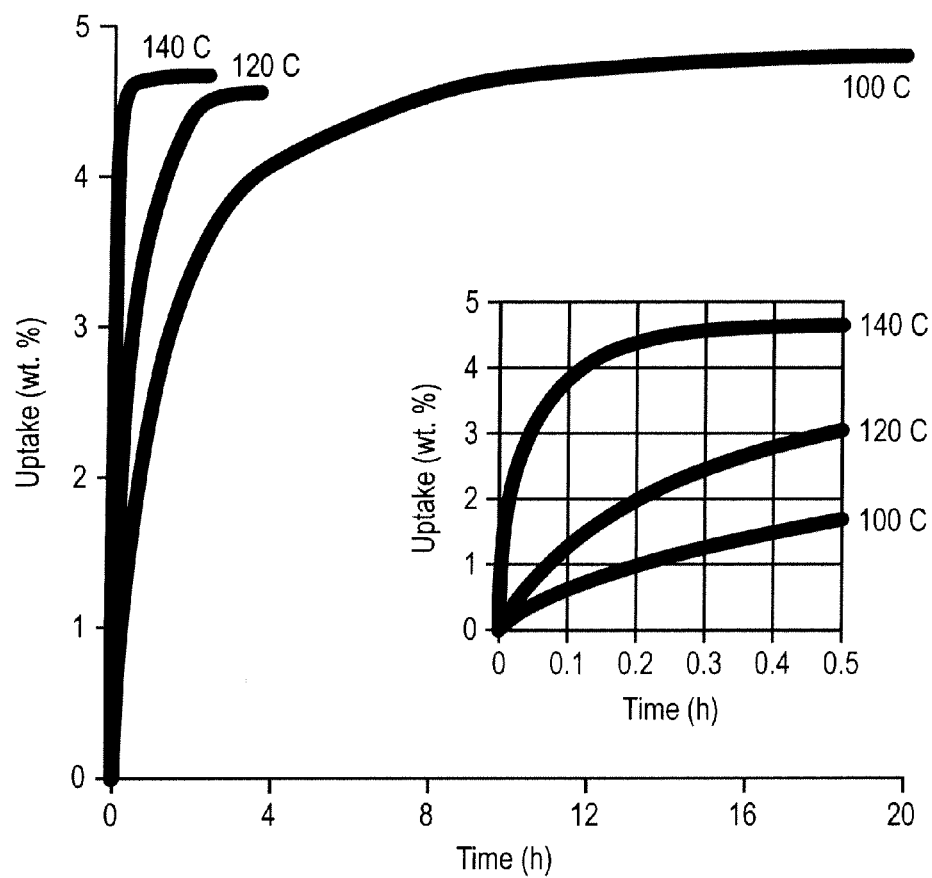
FIG. 6 illustrates hydrogen uptake, as a function of time and temperature, of a material synthesized from $LiNH_2$:$MgH_2$::2:1 with 5 mol. % $LiBH_4$, 0.5 mol. % La, and 5 mol. % $Li_3N$, according to an embodiment of the invention.

Synthesis and Characterization of Hydrogen Storage Material with Three Additives A hydrogen storage material was synthesized using a combination of three different additives and characterized in accordance with the methodology set forth in Example 1. In particular, LiNH$_2$, MgH$_2$, LiBH$_4$, La, and Li$_3$N were added in a stoichiometric ratio of about LiNH$_2$:MgH$_2$::2:1 with 5 mol. % LiBH$_4$, 0.5 mol. % La, and 5 mol. % Li$_3$N, and subjected to ball milling. Following ball milling, hydrogen uptake of the resulting material was measured as a function of temperature, and results of the measurements at about 100° C., about 120° C., and about 140° C. are illustrated in FIG. 6. The material exhibited superior kinetics in hydrogen uptake relative to the absence of an additive and relative to certain additives when used alone or in pairs. In particular, hydrogen uptake was about 1.8 wt. % H$_2$ in about 30 min at about 100° C. and about 50 bar, and about 4.7 wt. % H$_2$ in about 30 min at about 140° C. and about 50 bar. In addition to superior kinetics, the material also exhibited excellent retention of hydrogen storage capacity over measured cycles, with a loss of about 2% in capacity over those cycles.

Example 14

Figure 7:
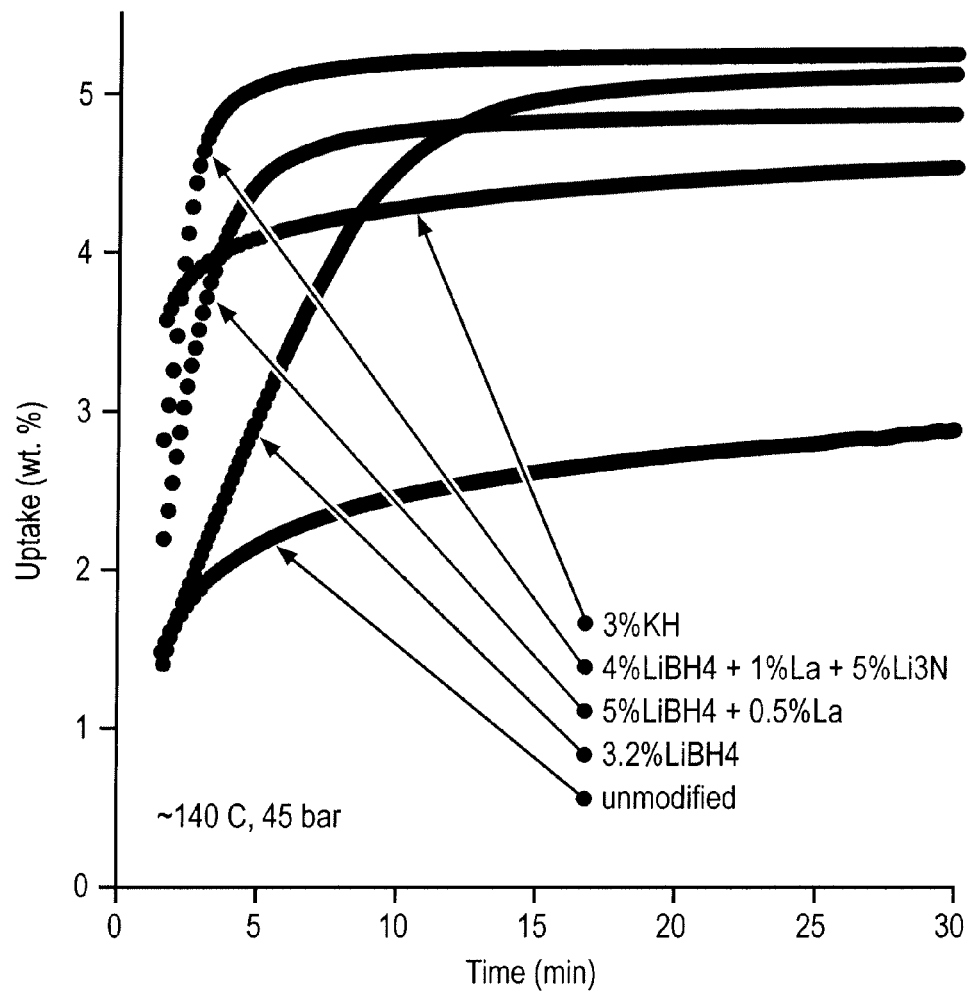
FIG. 7 illustrates hydrogen uptake, as a function of time, of materials synthesized without an additive, with single additives, with a pair of additives, and with a combination of three additives, according to an embodiment of the invention.

Synthesis and Characterization of Hydrogen Storage Materials with and without Additives In accordance with the methodology set forth in Example 1, hydrogen storage materials were synthesized without an additive, with 3 mol. % KH as a single additive, with 3.2 mol. % LiBH$_4$ as another single additive, with 5 mol. % LiBH$_4$ and 0.5 mol. % La as a pair of additives, and with 4 mol. % LiBH$_4$, 1 mol. % La, and 5 mol. % Li$_3$N as a combination of three additives. The materials were substantially fully degassed at about 140° C. for about 15 hr, and hydrogen uptake of the materials was then measured. FIG. 7 illustrates results of the measurements as a function of time, which are based on exposure to H$_2$ gas at about 45 bar and about 140° C. As can be appreciated with reference to FIG. 7, inclusion of the additives yielded superior kinetics in hydrogen uptake relative to the absence of an additive. Also, the combination of three additives yielded superior kinetics relative to the pair of additives and relative to the single additives. In particular, as illustrated in FIG. 7, hydrogen uptake for the combination of three additives was about 5.0 wt. % H$_2$ in about 5 min, while hydrogen uptake for the pair of additives was about 4.1 wt. % H$_2$ in about 5 min.

Example 15

Synthesis and Characterization of Hydrogen Storage Materials with and without Additives In accordance with the methodology set forth in Example 1, hydrogen storage materials were synthesized without an additive, with 3 mol. % LiBH$_4$ as a single additive, with 3 mol. % LiBH$_4$ and 1 mol. % La as a pair of additives, with 5 mol. % LiBH$_4$ and 1 mol. % La as another pair of additives, and with 5 mol. % LiBH$_4$, 1 mol. % La, and 5 mol. % Li$_3$N as a combination of three additives. The materials were substantially fully degassed at about 140° C. for about 15 hr, and hydrogen uptake of the materials was then measured after about 10 hr at about 120° C., and so on for several measurement cycles. Table 1 below sets forth results of the measurements expressed in terms of loss of hydrogen storage capacity over five cycles. As can be appreciated with reference to Table 1, inclusion of the additives typically yielded superior retention in hydrogen storage capacity relative to the absence of an additive. Among the materials synthesized, 5 mol. % LiBH$_4$ and 1 mol. % La as the pair of additives yielded a maximum retention of hydrogen storage capacity over five cycles, with a loss of about 0.63% in capacity over those cycles. It is expected that the observed trend in retention of hydrogen storage capacity over five cycles is representative of the trend over a larger number of cycles.

TABLE 1

| Hydrogen Storage material (in terms of additive) | % Capacity loss after 5 cycles = 100(Cycle 1 capacity − Cycle 5 capacity)/ (Cycle 1 capacity) |
| --- | --- |
| 5 mol. % LiBH$_4$, 1 mol. % La, and 5 mol. % Li$_3$N | 3.94 |
| 5 mol. % LiBH$_4$ and 1 mol. % La | 0.63 |
| 3 mol. % LiBH$_4$ and 1 mol. % La | 3.82 |
| 3 mol. % LiBH$_4$ | 2.95 |
| No additive | 6.04 |

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A hydrogen storage material, comprising:
a mixed imide having a formula Li$_i$Mg$_j$N$_k$H$_l$; and
a set of additives, wherein the set of additives is included within the mixed imide as a set of dispersed components;
wherein each of i, k, and l is in the range of 1.7 to 2.3, and j is in the range of 0.7 to 1.3; and
wherein the hydrogen storage material is configured to absorb at least 3.1 wt. % of H$_2$ within 30 minutes of exposure to H$_2$ gas at a temperature in the range of 100° C. to 140° C. and a pressure in the range of 45 bar to 50 bar.

2. The hydrogen storage material of claim 1, wherein each of i, k, and l is in the range of 1.9 to 2.1, and j is in the range of 0.9 to 1.1.

3. The hydrogen storage material of claim 2, wherein the mixed imide corresponds to Li$_2$Mg(NH)$_2$.

4. The hydrogen storage material of claim 1, wherein the set of additives is included within the mixed imide as a set of dopants.

5. The hydrogen storage material of claim 1, wherein the set of additives corresponds to at least two additives that are different from one another.

6. The hydrogen storage material of claim 5, wherein the set of additives corresponds to at least three additives that are different from one another.

7. The hydrogen storage material of claim 1, wherein each of the set of additives is selected from oxides, hydrides, nitrides, chemical elements, supported metals, chlorides, porous carbon materials, particulate silicon materials, and intermetallics.

8. The hydrogen storage material of claim 1, wherein a molar percentage of the set of additives is in the range of 1% to 40%.

9. The hydrogen storage material of claim 8, wherein the molar percentage of the set of additives is in the range of 3% to 35%.

10. The hydrogen storage material of claim 1, wherein the hydrogen storage material is configured to absorb at least 3.5 wt. % of H$_2$ within 30 minutes of exposure to H$_2$ gas at the temperature in the range of 100° C. to 140° C. and the pressure in the range of 45 bar to 50 bar.

11. A method of synthesizing a hydrogen storage material configured to absorb at least 3.1 wt. % of H$_2$ within 30 minutes of exposure to H$_2$ gas at a temperature in the range of 100° C. to 140° C. and a pressure in the range of 45 bar to 50 bar, comprising:
ball milling LiNH$_2$, MgH$_2$, and at least two different additives to form particles including Li$_2$Mg(NH)$_2$, wherein each of the additives is selected from oxides, hydrides, nitrides, chemical elements, supported metals, chlorides, porous carbon materials, particulate silicon materials, and intermetallics and wherein the additives are included within the particles as dispersed components.

12. The method of claim 11, wherein the additives are included within the particles as dopants.

13. The method of claim 11, wherein an average size of the particles is in the range of 1 nm to 1 µm.

14. The method of claim 13, wherein the average size of the particles is in the range of 1 nm to 100 nm.

15. A method of synthesizing a hydrogen storage material configured to absorb at least 3.1 wt. % of $H_2$ within 30 minutes of exposure to $H_2$ as at a temperature in the range of 100° C. to 140° C. and a pressure in the range of 45 bar to 50 bar, comprising:

ball milling LiH, $Mg(NH_2)_2$, and at least two different additives to form particles including $Li_2Mg(NH)_2$, wherein each of the additives is selected from oxides, hydrides, nitrides, chemical elements, supported metals, chlorides, porous carbon materials, particulate silicon materials, and intermetallics and wherein the additives are included within the particles as dispersed components.

16. The method of claim 15, wherein a first one of the additives corresponds to a hydride, and a second one of the additives corresponds to a nitride.

17. The method of claim 15, wherein a first one of the additives corresponds to a hydride, and a second one of the additives corresponds to a chemical element.

18. The method of claim 15, wherein a first one of the additives corresponds to a hydride, a second one of the additives corresponds to a nitride, and a third one of the additives corresponds to a chemical element.

* * * * *